United States Patent
Focking

(10) Patent No.: US 6,756,762 B2
(45) Date of Patent: Jun. 29, 2004

(54) METHOD AND ACTUATION CONTROL FOR STOPPING AN ELECTRICAL DRIVE, BY MEANS OF CLOSED-LOOP POSITION CONTROL, IN A PREDETERMINED NOMINAL POSITION

(75) Inventor: Bernhard Focking, Erlangen (DE)

(73) Assignee: Siemens Aktiengesellschaft (DE)

( * ) Notice: Subject to any disclaimer, the term of this patent is extended or adjusted under 35 U.S.C. 154(b) by 6 days.

(21) Appl. No.: 09/848,682

(22) Filed: May 3, 2001

(65) Prior Publication Data

US 2002/0113566 A1 Aug. 22, 2002

(30) Foreign Application Priority Data

Dec. 13, 2000 (DE) .......................................... 100 62 025

(51) Int. Cl.⁷ .............................................. G05B 11/36
(52) U.S. Cl. ....................... 318/609; 318/594; 318/596; 318/615
(58) Field of Search ................................ 318/560, 569, 318/592, 594, 596, 600, 601, 609, 610, 615–619

(56) References Cited

U.S. PATENT DOCUMENTS

| | | | |
|---|---|---|---|
| 3,721,882 A | * 3/1973 | Helms | 318/594 |
| 4,647,826 A | * 3/1987 | Ota | 318/561 |
| 5,079,490 A | * 1/1992 | Kita et al. | 318/569 |
| 5,090,002 A | * 2/1992 | Chow et al. | 369/44.28 |

FOREIGN PATENT DOCUMENTS

| | | |
|---|---|---|
| JP | 57-009277 | 1/1982 |
| JP | 62-012393 | 1/1987 |
| JP | 07-031172 | 1/1995 |

OTHER PUBLICATIONS

*Implementation and Position Control Performance of a Position–Sensorless IPM Motor Drive System Based on Magnetic Saliency*, by Satoshi Ogasawara, IEEE Transactions on Industry Appl., vol. 34, No. 4, 1998.

* cited by examiner

*Primary Examiner*—Bentsu Ro
(74) *Attorney, Agent, or Firm*—Baker Botts LLP

(57) ABSTRACT

The invention reduces the oscillation of the rotation speed regulator when stationary—despite low position resolution and a high minimum rotation speed resulting from this—by switching the closed-loop control structure, when the drive is moved into the nominal position, in which case the closed-loop control structure does not need to include a current regulator when stationary. The control voltage is predetermined directly by the rotation speed regulator (2'), which is in the form of a pure P-regulator. If the rotor is deflected, then dynamic negative feedback is carried out by differentiation (9) of the position ($\phi$). The position control loop (1'), which is at a higher level than the rotation speed control loop (2'), is in the form of a PI regulator in order that no permanent position errors can occur. The switching of the closed-loop control structure according to the invention is achieved by producing characteristics which are optimized as a function of the state, namely high dynamics during movement and a good unmoving position when stationary.

15 Claims, 2 Drawing Sheets

METHOD AND ACTUATION CONTROL FOR STOPPING AN ELECTRICAL DRIVE, BY MEANS OF CLOSED-LOOP POSITION CONTROL, IN A PREDETERMINED NOMINAL POSITION

FIELD OF THE INVENTION

The invention relates to a method for stopping an electrical drive, by means of closed-loop position control, in a predetermined nominal position, and to corresponding drive control.

When drives with closed-loop position control and a conventional cascaded closed-loop control structure, which are also used for rotation speed control, are stationary by means of closed-loop position control, its rotation speed regulator may experience undesirable oscillations.

As a rule, this oscillation is associated with low position resolution and position sampling at discrete times which leads to "minimum quantization" of the rotation speed, which energizes the rotation speed regulator when new position information occurs. This results in position deflection, which the position regulator has to counteract.

Figure 1:
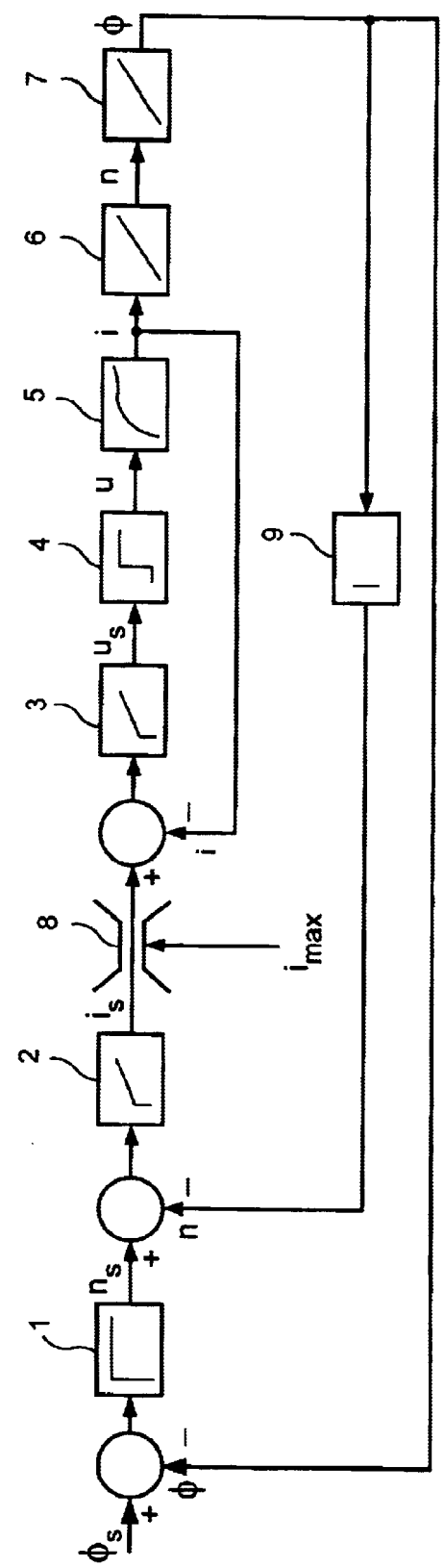

FIG. 1 shows a block diagram of such a known conventional cascade closed-loop control structure, in which this problem can occur. In this structure, PI current control 3 forms the innermost control loop, by supplying a control voltage $u_s$ for control equipment 4 in order to produce actuation signals for the electric motor (for example for the active power devices in a three-phase bridge inverter for a three-phase machine). The actual current value i which occurs in the armature circuit 5 whose input side is actuated by the motor voltage u is fed back negatively to the input of the current regulator 3.

At a higher level, there is a PI rotation speed regulator 2, whose associated actual rotation speed value n, which is likewise fed back negatively to the input, is formed by differentiation of the actual position value $\phi$. The output of the rotation speed regulator 2 with the nominal current value is is limited by current limiting 8 to the maximum permissible current $i_{max}$.

The outer control loop is formed by a P-position regulator 1 whose nominal position value $\phi_s$ is predetermined by higher-level path control (not shown). An actual position value $\phi$ is likewise fed back negatively to the input of the position regulator 1.

Drives having a positioning capability are nowadays normally provided by using DC motors with or without brushes, or synchronous motors with permanent-magnet excitation. As a rule, the actual position value is formed via an incremental sensor with a downstream step-up/down counter 7, whose input is actuated by a mechanical integrator 6. The mechanical integrator 6 has actual current values i applied to it, and describes the physical relationship between the rotation speed n and the torque M in accordance with $$\omega = \frac{1}{J} \cdot \int M \cdot dt \text{ where}$$

$\omega = 2 \cdot \pi \cdot n, M \approx i,$ which results in the following relationship:

$n = K \cdot \int i \cdot dt.$

The overall open-loop sequence control and closed-loop control are preferably carried out digitally in a microprocessor, with the individual control loops 1, 2 and 3 being calculated cyclically at fixed time intervals, and with the cycle time of a respective low-level control loop having to be less than or equal to that of the higher-level control loop.

In the past, this undesirable state has been solved and good stationary response with closed-loop position control has been achieved either by the incremental sensor having very high position resolution or by low gains in the position and rotation speed control loops.

Increased position resolution in the incremental sensor reduces the minimum rotation speed, which is governed by the quantization. Implementation with high position resolution used to minimize the rotation speed quantization results, however, results in expensive sensor systems with small quantization intervals. The small quantization intervals also have to be evaluated "in a complex manner" by interpolation, which cannot be done cost-effectively in all applications.

On the other hand, reducing the gains in the position and rotation speed control loops reduces the control quality, particularly when load torques are present. If the motor has magnetic cogging torques, undesirable compensation movements can occur.

The object of the present invention is thus to provide closed-loop control in which this undesirable oscillation of the rotation speed regulator when the motor is stationary is avoided, despite low position resolution.

According to the present invention, this object is achieved by a method for stopping an electrical drive, by means of closed-loop position control, in a predetermined nominal position by switching a closed-loop control system for movement operation and after reaching the predetermined nominal position to position-maintenance closed-loop control, having rotation speed control with a proportional element and higher-level position control with a proportional element and an integrating element.

According to a first advantageous refinement of the method according to the present invention, current limiting is carried out after reaching a predetermined nominal position and until the next movement instruction, in that, if a predetermined current limit value is exceeded in the armature circuit of the drive, the control voltage for the rotation speed control is limited.

For implementation of the method according to the invention, it has been found to be advantageous for the proportional gain of rotation speed control to be optimized to the mass moment of inertia of the electric motor being used.

For the proportional gain and the integrating-action time of the integrating element of the closed-loop position control, it is recommended that these items be permanently set to the controlled system of the position-maintenance closed-loop control.

For integration of the method according to the invention in an existing control system of an electrical drive with closed-loop position control, this drive is moved to a respective nominal position, according to a further advantageous refinement, with cascade closed-loop control by means of current control, higher-level rotation speed control and even higher-level position control, in which case, after reaching this predetermined nominal position and until the next movement instruction, the drive is controlled by modified cascade closed-loop control without current regulation as described above.

In order to avoid discontinuities when switching between movement operation and position-maintenance closed-loop control, the integrating elements of the respective control structure which are not required may be set to zero.

Furthermore, the object of the invention is also achieved by drive control for stopping an electrical drive, by means of closed-loop position control, in a predetermined nominal position, with a cascade closed-loop control structure comprising a P-regulator for rotation speed control which is used to produce a control voltage for control equipment for the drive, and having a higher-level PI regulator for closed-loop position control.

Such drive control according to the invention is particularly effective if the actual position values can be obtained by means of an incremental sensor with a downstream counter, and actual rotation speed values can be determined from this by a means for differentiation.

A further advantageous refinement of this drive control according to the invention additionally comprises a means for limiting the control voltage on the output side of the P-regulator by an integrator when a predetermined current limit value is exceeded in the armature circuit of the drive.

The method according to the invention and the drive control according to the invention thus reduce the oscillation of the rotation speed regulator when stationary—despite low position resolution and a high minimum rotation speed resulting from this—by switching the closed-loop control structure when the drive has moved to the nominal position.

Figure 2:
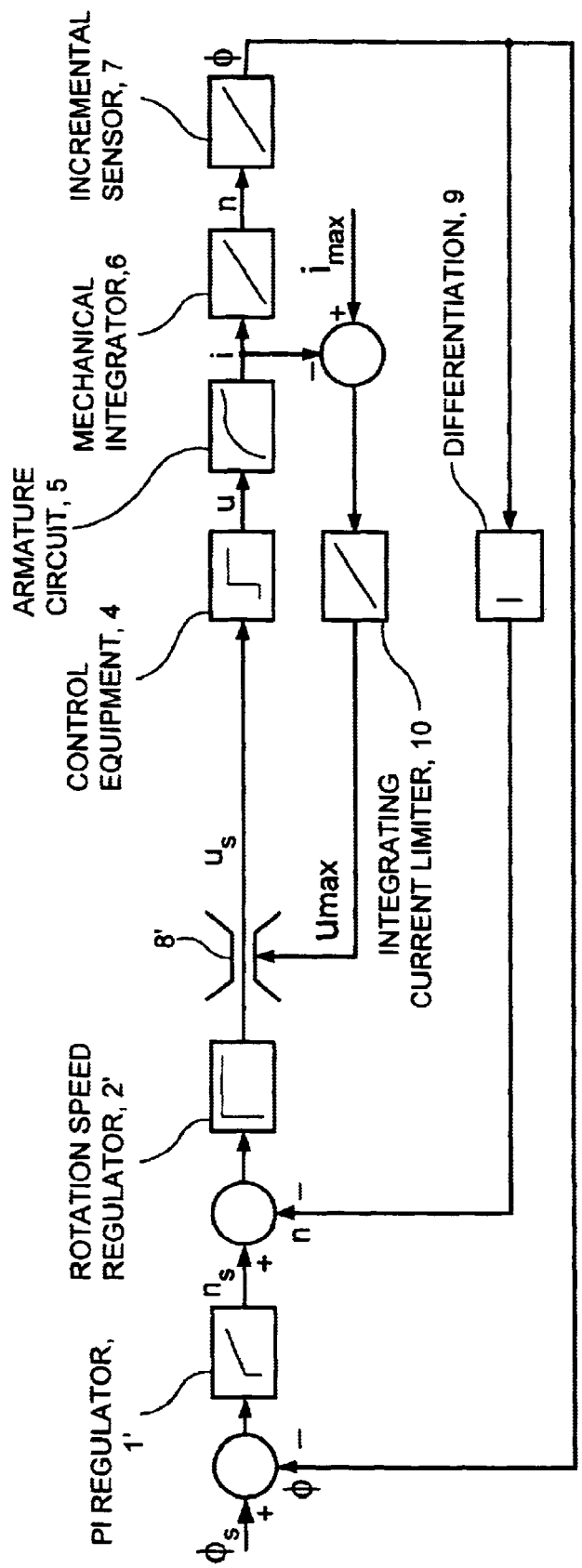

The exemplary embodiment which is described in the following text is used to explain further details and advantages of the invention with reference to a block diagram of a closed-loop control structure according to the invention. In the outline illustration:

FIG. 1 shows a block diagram of a conventional cascade closed-loop control structure for controlling movements for an electrical drive with closed-loop position control, and FIG. 2 shows a block diagram of a closed-loop control structure according to the invention for switching when stationary.

The conventional closed-loop control structure shown in FIG. 1 which has already been explained initially is suitable for controlling movements. However, if the movement speed is so low that the incremental sensor 7 no longer supplies at least one position increment in each rotation speed regulator cycle, then it is no longer possible to achieve by differentiation a continuous actual rotation speed value n over time.

Particularly when stationary, this leads to a situation in which the gain in the rotation speed control loop must be reduced from the optimum values, thus also limiting the position regulator gain which can be set. Position errors which are caused by disturbance and cogging torques (for example magnetic cogging torques) can thus be compensated for less well.

When the drive has moved to a predetermined nominal position, higher-level sequence control (not shown), for example a numerical control NC, switches, according to the invention, to a regulator structure as shown in FIG. 2, whose object is to maintain this position as well as possible until the next movement starts.

This can be achieved particularly easily if the closed-loop control structure is calculated digitally in a microporcessor or microcontroller since, then, all that is necessary is to redefine the closed-loop control model in the software.

As can be seen from the block diagram of a closed-loop control structure according to the invention as shown in FIG. 2, this structure does not need any current regulator 3 (FIG. 1). The control voltage is predetermined directly by the rotation speed regulator 2'. In contrast to the conventional cascade regulator structure shown in FIG. 1, the regulator 2' has a form of a pure P-regulator with a proportional element, but without any integrating element. This rotation speed regulator 2' thus directly supplies the control voltage $u_s$ for the control equipment 4. A construction of the remaining armature circuit 5, mechanical integrator 6 and rotor position detection by means of the incremental sensor with a step-up/down counter 7 corresponds to that in FIG. 1.

As long as the drive is stationary in the nominal position, this drive remains absolutely stationary by virtue of the closed-loop control structure shown in FIG. 2, having a rotation speed regulator 2' without an integrating element.

If the rotor of the motor is deflected, for example by external influences, then differentiation 9 of the position φ results in dynamic negative feedback. The position control loop, which is at a higher level than the rotation speed control loop, is in the form of PI regulator 1' so that no residual position errors, can occur. In comparison to the conventional closed-loop control structure for movements as shown in FIG. 1, the position regulator 1' according to the invention also has an integrating part, with the function that has been explained, in addition to the known proportional part.

The testing and the changes of the regulator structures as shown in FIG. 1 and FIG. 2 are carried out, for example, in a rotation speed nominal value output $n_s$, which is called cyclically. When switching to the position-maintenance regulator (FIG. 2), the position-maintenance nominal value required on activation is formed using the following formula:

$$\text{Nominal maintenance position} = \text{actual position} - \frac{\text{Slip distance}}{\text{Increment movement}}$$

If the "nominal maintenance position" overflows, overflow correction must be carried out.

The rotation speed control is preferably implemented using the fastest time slice (for example 125 μs) using a P-regulator whose gain is optimized to the mass moment of inertia of the motor being used. The inner control loop allows a good stationary behavior despite low actual position value resolution. The P-gain is preset as a function of the specific motor. The P-gain can be adapted by the end user, if required.

The actual rotation speed value calculation is carried out as follows:

$$n\_ist = \frac{lage\_aktuell - lage\_alt}{Zykluszeit}$$

$$\left[ n - act = \frac{present\ position - old\ position}{cycletime} \right]$$

The outer PI position control loop 1' ensures that there be no permanent control errors. The proportional gain and the integrating-action time, or the integrating element, are permanently set to the controlled system. The control loop gains are in this case preferably reduced such that operation with external flywheel masses up to 3 times the motor mass moment of inertia is possible without any problems. In "exotic" applications with even higher mass moments of inertia, the proportional gain of the inner rotation speed control loop 2' must be increased accordingly.

The current regulator 3 (FIG. 1) is superfluous, and is omitted here for computation time reasons. However, the current limiting should still be active. An integrating current limiter 10 is thus activated. This operates, for example, in the background of the application.

The current limiting still remains active in that, if the limit value ibex is exceeded, the voltage limiting 8' for the control voltage $u_s$ supplied on the output side from the rotation speed regulator 2' is tightened via an integrator 10.

The regulator structure according to the invention, which is simpler than the conventional cascade regulator structure shown in FIG. 1, allows the entire position closed-loop control to be calculated in a shorter cycle time. In order that the switching between normal operation and position-maintenance closed-loop control can take place without any discontinuities, the integrating elements of the respective regulator structure which is not required are set to zero. This is the PI position regulator 1' when stationary, and the rotation speed regulator 2 and the current regulator 3 for movement operation.

The switching of the closed-loop control structure according to the invention thus results in optimized characteristics being produced as a function of the state, namely: high dynamics during movement and good position rest when stationary.

What is claimed is:

1. A method for stopping an electrical drive in a predetermined nominal position, comprising the steps of:
    a) controlling the movement operation of the electrical drive using a closed loop control system for movement operation until the drive reaches a predetermined nominal position; and
    c) maintaining said nominal position by switching from said closed-loop control system for movement operation to a position maintenance closed-loop control for the electrical drive when a predetermined nominal position of the electrical drive is reached, said position maintenance closed-loop control further comprises:
        a rotation speed control with a proportional element; and
        a higher level position control with a proportional element and an integrating element.

2. The method of claim 1, wherein said maintaining said predetermined position includes limiting a drive current after said predetermined nominal position is reached until a new movement instruction is received by said closed-loop control system for controlling movement operation of the electrical drive.

3. The method of claim 1, further comprising optimizing a proportional gain of said rotation speed control to an electrical motor mass moment.

4. The method of claim 1, wherein a proportional gain and an integrating-action time of said integrating element of said closed-loop position control are set permanently to the controlled system of the position-maintenance closed-loop control.

5. The method of claim 1, wherein said predetermined nominal position is attained by using a cascade closed-loop control.

6. The method of claim 5, wherein said cascade-loop control further comprises:
    a current-control for controlling movement;
    an intermediate level rotation speed control; and
    a high level position maintenance control.

7. The method of claim 6, wherein said nominal position is maintained using a modified cascade closed-loop control, wherein said high level position maintenance control does not employ current control.

8. The method of claim 5, wherein said cascade closed-loop control further comprises:
    a P regulator for rotation speed control; and
    a higher lever PI regulator for closed-loop position control.

9. The method of claim 8, further comprising:
    an incremental sensor with downstream counter for obtaining actual position values; and
    a differentiator for obtaining actual rotation speed values.

10. The method of claim 8, further comprising a means for limiting the control voltage on the output side of said P-regulator by an integrator when a predetermined current limit value is exceeded in an armature circuit of the electrical drive.

11. The method of claim 1, wherein integral elements of particular control structures in said closed-loop control system which are not required are set to zero in order to avoid discontinuities when switching between movement operation and position maintenance closed-loop controls.

12. An apparatus for stopping an electrical drive in a predetermined nominal position, comprising:
    a) a closed loop control system for controlling the movement operation of the electrical drive until the electrical drive reaches a predetermined nominal position;
    b) a position maintenance closed-loop control system electrically disconnected from said closed loop control system for controlling the movement operation of the electrical drive; and
    c) a digital switch for switching from said closed loop control system for controlling the movement operation of the electrical drive to said position maintenance closed loop control system when said predetermined position is readied; and further comprising a cascade closed-loop control structure having a P-regulator for rotation speed control and a higher level PI-regulator for closed-loop position control.

13. The apparatus of claim 12, further comprising an incremental sensor with downstream counter for obtaining actual position values.

14. The apparatus of claim 13, further comprising a differentiator for determining actual rotation speed values.

15. The aparutus of claim 14, wherein said P-regulator comprises an output side, said apparatus further comprising a voltage regulator for limiting control voltage on said output side of said P-regulator when a predetermined current limit value is exceeded in the armature circuit of the drive.

* * * * *